United States Patent [19]

Rampolla et al.

[11] Patent Number: 5,155,542
[45] Date of Patent: Oct. 13, 1992

[54] DOUBLET PULSE PHASE CONJUGATE ATMOSPHERIC ENERGY TRANSFER SYSTEM

[75] Inventors: Robert W. Rampolla, Ellicott City; Gary D. Baldwin, Columbia, both of Md.

[73] Assignee: Westinghouse Electric Corp., Pittsburgh, Pa.

[21] Appl. No.: 603,331

[22] Filed: Oct. 24, 1990

[51] Int. Cl.⁵ .............................................. G01C 3/08
[52] U.S. Cl. ..................................... 356/5; 356/28.5
[58] Field of Search ...................... 356/4, 4.5, 5, 28.5; 350/311

[56] References Cited

U.S. PATENT DOCUMENTS 4,958,908  9/1990  Rockwell et al. .................. 350/311
5,018,852  5/1991  Cheng et al. ...................... 356/28.5

Primary Examiner—Mark Hellner
Attorney, Agent, or Firm—W. G. Sutcliff

[57] ABSTRACT

A coherent energy transfer system is disclosed which utilizes a doublet pulse laser transmitter in combination with a phase conjugate mirror (PCM) assembly. In one embodiment of the present invention, the first pulse of the doublet pulse signal illuminates the target, whereas the return pulse reflected from the target constitutes a weak signal to be processed using phase conjugate methods. The second pulse of the doublet phase signal activates the PCM assembly and constitutes the energy source used to produce an amplified, phase conjugated beam.

24 Claims, 2 Drawing Sheets

DOUBLET PULSE PHASE CONJUGATE ATMOSPHERIC ENERGY TRANSFER SYSTEM

BACKGROUND OF THE INVENTION

In the field of target location and communication technology, it is desirable to accurately transfer signals in the form of radiant energy over an atmospheric path from a transmission source (transmitter) to a remote receiver location (target). The use of atmospheric paths for the transfer of energy increases both the availability and number of transmission routes that are possible for use by a user as opposed to conventional energy transfer systems requiring the use of wires, cables and various transfer mediums other than air.

However, with the use of a new type of energy transfer system come new problems. One limitation upon the efficient transfer of radiant energy over an atmospheric path is the degree to which the transmitted beam can be collimated and accurately aimed at the target. Further limitations of atmospheric energy transfer systems include beam spreading or dispersion, as well as turbulence-induced beam jitter, each of which can compromise the integrity of the energy transfer.

The necessity for positioning accuracy of the transmitter and the receiver in any trans-atmospheric energy transfer system arises from the need for a portion of the transmitted beam to initially be intercepted by the target so as to produce sensible target return, i.e., signal return which exceeds the system threshold and is of sufficient intensity to distinguish the target from extraneous clutter and/or noise events. Suitable target returns will be produced, for example, if the target has highly reflective surfaces generally normal to the transmit beam axis, or incorporates retroreflective or similar materials that reflect light in a direction close to that at which it is incident. The small fraction of transmitter energy which is returned from the target location is directed into the appropriate processing apparatus of the energy transfer system for locating and tracking a specific target. However, it should be noted that the principles of the subject invention may also be employed in communication devices used to accurately transfer information or data from a first location to a second, remote location which can be independent and/or displaceable with respect to the first location.

In the utilization of phase conjugate technology, the small fraction of the transmitted energy which is returned to the transmitter from the target location is directed into a phase conjugate mirror (PCM) assembly. Since the returned signal is generally only a fraction of the strength of the originally transmitted signal, the returned signal is amplified by the PCM assembly. The amplification is typically performed with a modified spatial phase structure in such a manner that the energy signal is returned directly to the target without incurring an appreciable extent of turbulence related loss. The use of PCM techniques with a high gain PCM cell consequently result in the more efficient transfer of energy to the target location as compared to conventional energy transfer systems without the requirement for costly and temperamental precision beam aiming mechanisms.

The general principles of phase conjugate trans-atmospheric propagation of energy to a remote target, as presently known, typically involve the utilization of degenerate four wave mixing in sodium vapor. In these known utilizations, the necessity exists to employ a laser pump source which can be tuned to the 589 nm sodium emission line. To establish the desired tuned emission line in these utilizations, a single longitudinal mode laser pumped dye laser is employed. However, this configuration produces only very low phase conjugate reflectivities. In order to compensate for this problem, a high gain flashlamp pumped dye laser amplifier ($G = 10^4$/pass) can be inserted in the path between the sodium cell and the target. Although these known experiments did not achieve optimal phase conjugate reflectivity, they nevertheless demonstrated the efficacy of trans-atmospheric phase conjugation up to a distance of approximately 100 meters.

SUMMARY OF THE INVENTION

A coherent energy transfer system is disclosed for transferring optical energy over an atmospheric path from a transmission source to a remotely positioned receiver or target. The transfer system incorporates an oscillator/amplifier for generating a doublet pulse energy signal with a predetermined wavelength. A transmit/receive aperture is utilized to transmit the generated energy toward the target and to receive the energy reflected from the target. A phase conjugate mirror assembly amplifies and processes the energy signal reflected from the target to the transmit/receive aperture. The phase conjugate mirror assembly may typically include at least two separate phase conjugate mirrors. The first phase conjugate mirror receives the second pulse of the doublet signal reflected by the target and applies a predetermined frequency shift thereto. The second phase conjugate mirror utilizes Brillouin-enhanced four wave mixing to achieve phase conjugate mirror gains for the received first pulses of the doublet signal. After the completion of processing by the phase conjugate mirror, the conjugated beam may be directed back toward the remote target and may be utilized to transfer data or information to the remote location as part of a communication system.

BRIEF DESCRIPTION OF DRAWINGS

Further details of the subject invention will become apparent with reference to the following drawings, in which.

DETAILED DESCRIPTION OF THE PREFERRED EMBODIMENTS

The coherent energy transfer system of the present invention overcomes the aforementioned limitations of the prior art through the use of a doublet pulse laser transmitter in combination with a phase conjugate mirror assembly, thereby expanding the utility of the overall concept of trans-atmospheric energy propagation to a wider range of system applications. In one embodiment of the present invention, the first pulse of the doublet pulse signal illuminates the target and is reflected therefrom to constitute a signal to be phase conjugate processed. The second pulse of the doublet pulse signal activates a PCM assembly and constitutes the energy source used to produce an amplified, phase conjugated beam as the means by which energy can be transferred to a target or information or data can be transferred within a communication system. The time interval between the two successive pulses of the doublet pulse must approximate the round trip time of the signal between the transmitter and the target. If the time interval between successive pulses is inappropriate, the weak return signal from the target will neither be phase conjugated nor amplified.

The use of a doublet pulse transmission source is advantageous, for it permits either a narrow single pulse (typically on the order of about 10–20 ns) to be used to illuminate the target for range finding purposes or doublet pulses to implement the PCM function. A further advantage of using a doublet pulse transmission source is that it can accommodate pulse transmit time delays by varying the transmission time for the second pulse of the doublet pulse signal. The pulse transit time delays vary as a function of target range from the transmission source and must therefore be taken into account and processed in accordance with the times during which the PCM assembly is in an activated state. In contrast, in instances in which only a singlet pulse laser source is used, either a long pulse transmitter having a pulse duration equal to the transit time delay must be employed, thereby eliminating altogether the possibility of target ranging, or a separate laser pump source must be used to activate the PCM assembly.

Figure 1:
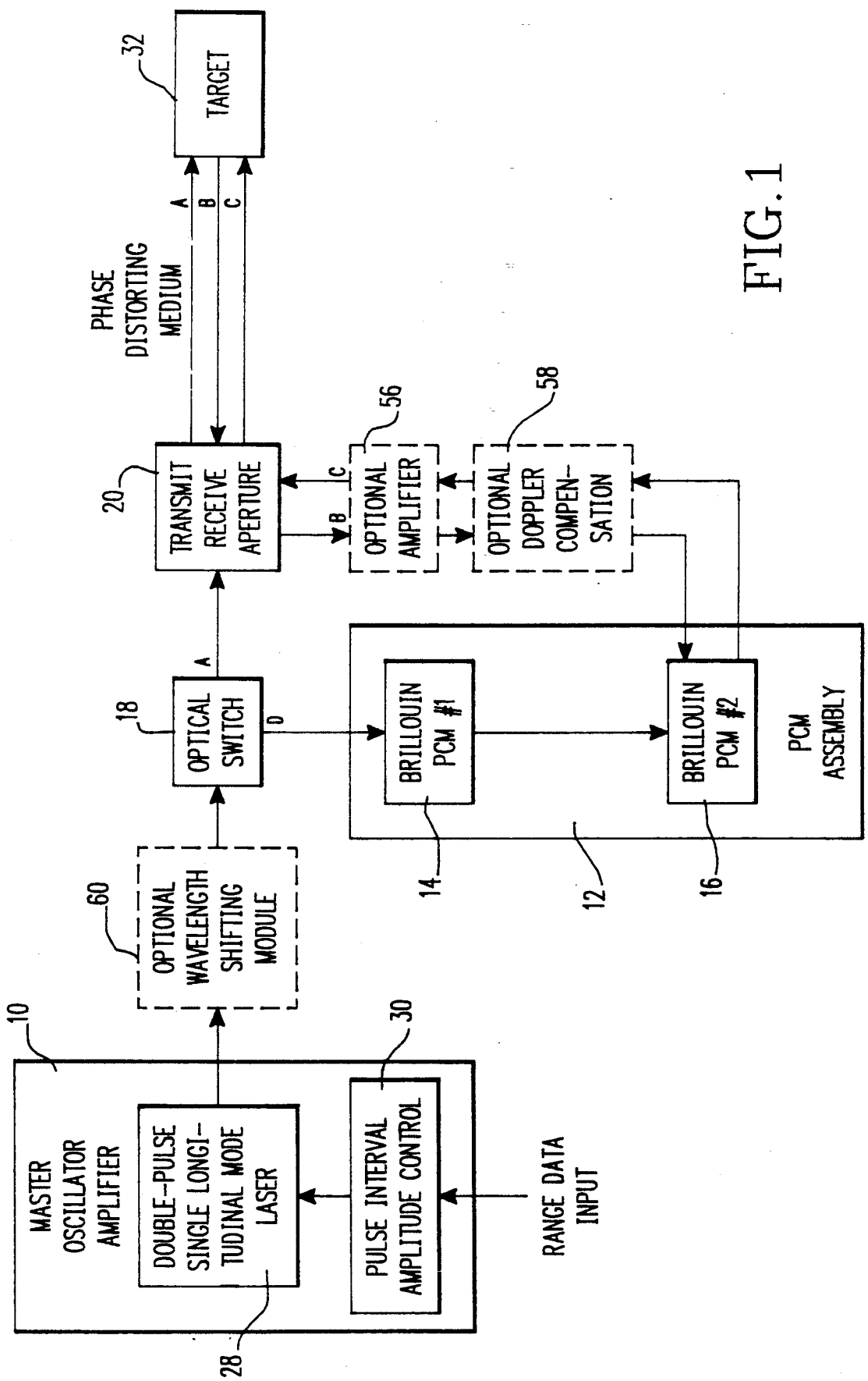
FIG. 1 is a block diagram of the coherent energy transfer system of the subject invention.

With reference to the drawings, wherein like reference characters represent corresponding parts throughout the various views, and with particular reference to FIG. 1, there is depicted an energy transfer system in accordance with the subject invention. The depicted energy transfer system is comprised of a pair of primary subsystems which provides the operational characteristics necessary for practical implementation of the phase conjugate energy transfer system of the present invention. The first of these subsystems, designated as the master oscillator-amplifier amplifier 10, generates intense laser pulses such as Q-switched pulses having a narrow linewidth in a preselected doublet pulse format. As used throughout this specification, the term "linewidth" refers to the interval in frequency or wavelength units between the points at which the absorbed or emitted power of an absorption (or emission) line is one-half of its maximum value when measured under standard operating conditions. The Q-switched pulses that are generated are typically of very short duration, typically on the order of about 30 ns, and are produced by enhancing the storage and dumping of electronic energy into and out of the lasing medium. In general, the phenomenon of phase conjugation is dependent on the pulse power and/or the power density of the signal. In other words, broader pulse widths could be used but higher pulse energy levels would then be required. Typically, present day lasers pulse widths are in the range of about 10 to 50 nanoseconds.

Output from the master oscillator-amplifier 10 is directed to the second of the two major subsystems, which is in the form of a phase conjugate mirror (PCM) assembly 12 that is typically comprised of two discrete PCM units, 14 and 16. The master oscillator-amplifier 10 output is processed by a dual path optical switch 18 prior to its arrival at the PCM assembly 12. The first pulse, indicated as character A in FIG. 1, of the doublet pulse is fully transmitted toward a target 32 via a transmit-receive aperture 20. The second pulse, indicated as character D of FIG. 1, of the doublet pulse is fully transmitted to the PCM assembly 12. The transmit-receive aperture 20 is the structural means by which signals are emitted by the energy transfer system of the present invention and are sent toward a target, and by which signals enter the transfer system after being reflected by a target. The transmit-receive aperture 20 can be employed in either a monostatic or bistatic configuration in accordance with system design parameters. The portion of the reflected signal that is received by the transfer system via the transmit-receive aperture 20 is designated by reference character "B" in FIG. 1. After the reflected signal B has been processed by the PCM assembly 12 in the manner described below, the conjugated beam C which results from PCM assembly processing may be directed back toward the target for the communication of data or information thereto. Additional components can optionally be included in the energy transfer system of the present invention to overcome particular operational concerns which may exist in specific environments where the system is to be used. Illustrations of some operational concerns and their respective solutions will be discussed below in this specification.

With regard to the specific operation of the two major subsystems 10 and 12 of the present invention, the oscillator/amplifier unit 10 includes a doublet pulse single longitudinal mode laser 28 and a pulse internal-amplitude control unit, as indicated by element 30 of FIG. 1. The doublet pulse laser 28 typically is comprised of a diode pumped, single longitudinal mode laser that is injection-locked to a Q-switched oscillator. The laser 28, in turn, drives a serial amplifier chain to produce the desired signal form. Single pulse or variable interval double pulse operation is implemented by independently controlling the time of pulse initiation as well as the Q ratio of the resonant cavity. As used herein, reference to the Q ratio pertains to the ratio of laser resonant cavity transmission factors required to generate singlet or doublet pulses. In a double pulse mode, the relative amplitude of each pulse is adjusted within oscillator-amplifier unit 10 to ensure adequate target illumination along with proper energy extraction from the phase conjugator. Preferably, each of the two sequential pulses generated by the laser 28 is at a common frequency to minimize the occurrence of pulse overlap and interference. Prior to the initiation of the energy transfer function, target range information can be obtained from any of a variety of known range determinant processing systems in order to allow for pre-setting of the interpulse period to be substantially equal to the transmitter-target round trip propagation time.

Figure 2:
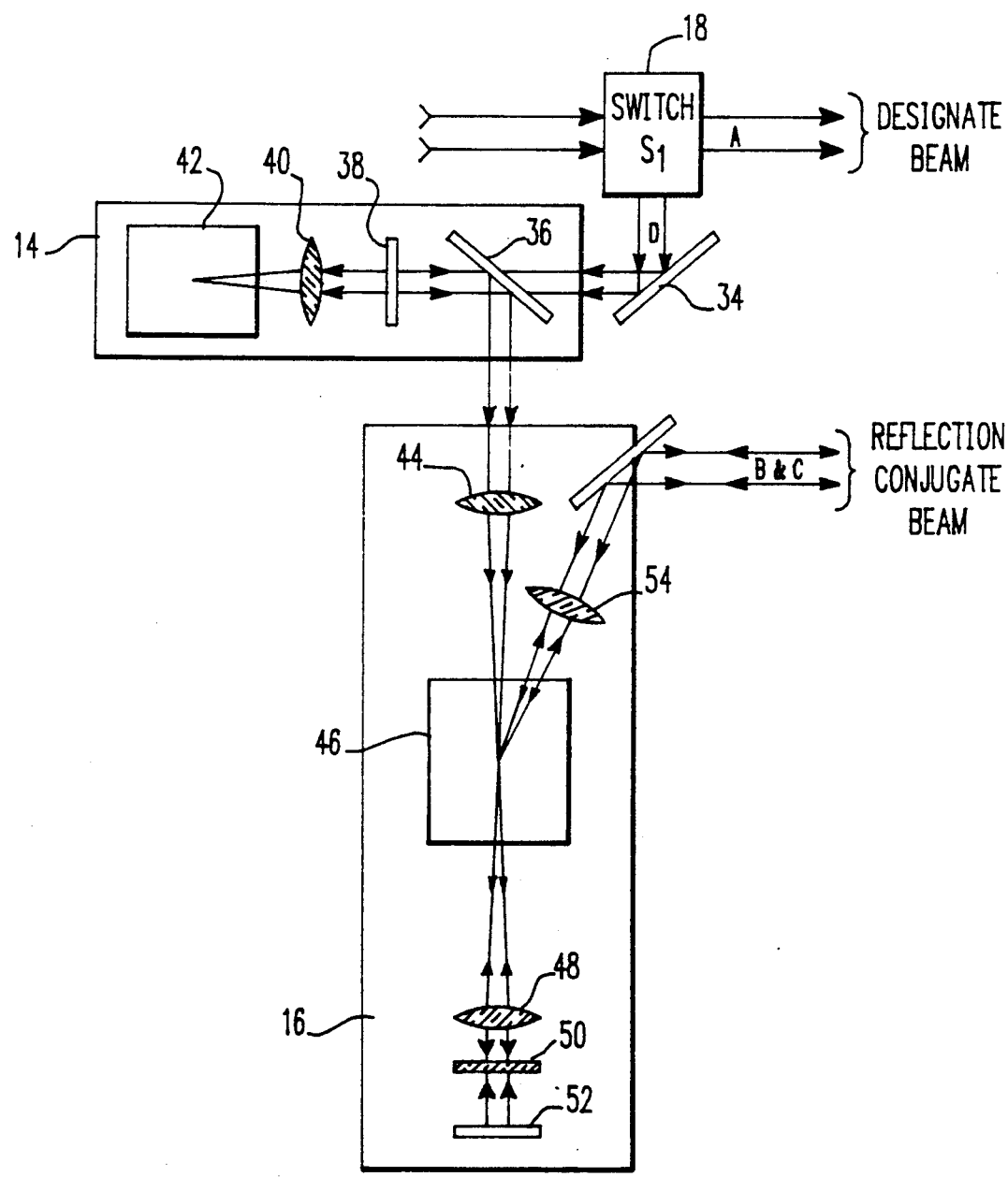
FIG. 2 is an optical diagram of the PCM assembly utilized in the subject invention.

As mentioned previously, the PCM assembly 12 is generally comprised of first and second PCM units, designated as PCM #1 (element 14) and PCM #2 (element 16). A typical schematic of the PCM assembly 12 is illustrated in FIG. 2. Optical switch 18 at the input of PCM assembly 12 directs the first pulse from the doublet laser transmitter 28 toward the target 32; this transmitted beam is designated as beam "A" in FIGS. 1 and 2. In time coincidence with the pulse return from the target 32, the optical switch 18 directs the second pulse of the doublet, designated as beam "D" in FIGS. 1 and 2, into the PCM assembly 12. After reflection from mirror M, element 34 of FIG. 2, the second pulse enters PCM #1 and undergoes a frequency shift of a magnitude represented by $\Delta W$. As shown in FIG. 2, the PCM #1 is comprised of a serial array of a polarizer 36, a phase retardation plate 38 having a $\lambda/4$ retardation, a focusing lens 40, and a cell 42 containing any known Brillouin active material. Linearly polarized radiation entering PCM #1 via polarizer 36 is circularly polarized by retardation plate 38 and focused by lens 40 into the Brillouin medium. Stimulated Brillouin scattering (SBS) in the cell 42 creates a phase conjugated beam which, after being linearly polarized by retardation plate 38, is directed by polarizer 36 toward PCM #2.

Whereas PCM #1 employs SBS to create a phase conjugate beam, the operational of PCM #2 is based on Brillouin enhanced four wave mixing. Lens 44 focuses the incident radiation within the Brillouin cell 16 to a power density at the cell cite, designated by reference character "R", that is marginally less than that required for SBS. Preferably, the Brillouin medium in cells 42 and 46 comprise substantially identical material to ensure consistent scattering. After recollimation by lens 48, attenuation by element 50 and reflection from mirror 52, the beam is re-focused at cite R within the Brillouin cell 46. Within the context of four wave mixing, the beams are to be considered as counter-propagating pump beams. Simultaneous with the occurrence of the pump pulse at cite R, radiation from the first pulse, which was scattered by the target 32, is returned via the receiving aperture 20 along path B and focused at site R by lens 54. Target return radiation at frequency $W_0$ interacts with the weak pump beam at frequency ($W_0 - \Delta W$) to form a spatial phase grating in Brillouin cell 46 which propagates at hypersound velocity toward lens 48. By virtue of the fact that the frequency shift induced by the stimulated Brillouin scattering in PCM #1 is resonant with the hypersound frequency in Brillouin cell 46, the grating diffracts radiation in the stronger of the two pump beams to produce an intense beam which is the phase conjugate of the target return beam. Using this technique, PCM gains of $10^4$ and $10^5$ have been achieved.

Although PCM #1 has been described in the preferred embodiment as being a phase conjugate mirror comprising the specific components set forth above, it should be noted that the principal purpose of PCM #1 is to provide a frequency shift of $\Delta W$ on the second pulse. Therefore, in accordance with a second embodiment of the present invention, the first PCM may be in the form of any type of known variable frequency source. By using a variable frequency source, the signal being input into PCM #2 can be fine-tuned to a specific, desired frequency.

In applications of the phase conjugate transfer system of the present invention where the strength of the returned signal is so low as to require additional gain in order to be processed adequately, it may be desirable to incorporate an optical intra-PCM target amplifier 56 into the signal processing system, as shown in FIG. 1. Low strength return signals can arise when the target is a considerable distance from the transmitter as well as when the target is comprised of only moderately reflective materials.

Reduced PCM signal amplification can arise from the Doppler shift that may be introduced to a signal by transmitter/target relative motion. Therefore, when the transfer system of the present invention is being used in an environment subject to relative motion between the transmission source and the target, it may be desirable to incorporate a Doppler frequency shift compensator 58 in conjunction with signal processing at PCM #2, as depicted in FIG. 1. The Doppler frequency shift compensator 58 may be used to optimize the operation of PCM #2 (16) in such relative motion environments, since the Brillouin enhanced four-wave mixing upon which PCM #2 is based requires control of the relative optical frequencies involved in the mixing process.

The frequency range over which the coherent energy transfer system of the present invention is based may be extended through the use of a wavelength shifting module 60 that is positioned at the output end of the oscillator-amplifier. Types of wavelength shifting devices which can be employed are limited only by the requirement that they not degrade the coherence length of the master oscillator and that the shifted radiation does not fall outside the PCM assembly transmission band. As used herein, the term coherence length refers to the propagation distance over which a light beam may be considered coherent, i.e., the extent to which an electric vector at any point in the beam is related to that at any other point by a definite, continuous sinusoidal function. Wavelength shifting devices based on non-linear interactions (i.e., second harmonic generation) and stimulated scattering (i.e., stimulated Raman scattering) may also be employed in applications relating to the present invention.

As stated above, the use of a doublet pulse laser source provides an energy transfer system with substantial advantages over previous systems which utilize a single pulse laser. The combination of a doublet pulse laser source with a PCM assembly provides an energy transfer system that is capable of performing in a manner which cannot be attained by conventional systems.

The radiant energy transfer system of the present invention is also advantageous because energy transfer to the target may be accomplished in a single transmitter-to-target pulse round trip time, thereby minimizing any restrictions that might otherwise occur due to the effects of relative motion between the transmission source and the remote target. For most applications of this system, there does not exist a need for additional amplification of the energy signal in the path between the PCM assembly and the target due to the high gain yielded by the double mirror array in the PCM assembly. A further advantage of the present invention is that wavelength diversity can be accommodated with a single PCM module, as system performance is not tied to a specific wavelength of laser transmission.

While the invention has been described in connection with specific embodiments thereof, it will be understood that it is capable of further modifications. This application is intended to cover any variations, uses or adaptations of the invention following the general principles of the invention, and including such departures from the present disclosure as come within known and customary practice within the art to which the invention pertains.

We claim:

1. A coherent optical energy transfer system for transferring optical energy over an atmospheric path from a transmission source to a remote target, comprising:

oscillator/amplifier means for generating a doublet pulse optical energy signal having a predetermined wavelength;

transmit/receive aperture means for transmitting said generated optical energy toward the target and receiving optical energy reflected from the target; and phase conjugate mirror means for amplifying the reflected optical energy signal.

2. The transfer system of claim 1, wherein said optical energy generated and transmitted by the oscillator/amplifier means comprises a plurality of narrow linewidth pulses.

3. The transfer system of claim 2, wherein said plurality of narrow linewidth pulses is approximately 30 ns in length and at least one pulse of said doublet pulse is enhanced by bi-directional transfer of electronic energy with respect to a lasing medium.

4. The transfer system of claim 1, further comprising dual path optical switching means for controlling and directing energy flow from said oscillator/amplifier means to one of said transmit/receive aperture means and the phase conjugate mirror means.

5. The transfer system of claim further comprising Doppler frequency shift compensator means connected between the transmit/receive aperture means and the phase conjugate mirror means for controlling the relative optical frequencies of the reflected energy signal.

6. The transfer system of claim 1, further comprising wavelength shifting means connected between said oscillator/amplifier means and said optical switching means for broadening the frequency range over which the transfer system is operable.

7. The transfer system of claim 6, wherein said wavelength shifting is obtained by utilizing non-linear interaction techniques.

8. The transfer system of claim 6, wherein said wavelength shifting is obtained by utilizing stimulated scattering techniques.

9. The transfer system of claim 1, further comprising supplemental amplifying means for amplifying energy reflected by the target.

10. The transfer system of claim 1, wherein the phase conjugate mirror means comprises at least two separate phase conjugate mirrors.

11. The transfer system of claim 10, wherein one of said phase conjugate mirror means includes a first phase conjugate mirror which receives the second pulse of a doublet signal generated by the oscillator/amplifier means and reflected by the remote target, and applies a predetermined frequency shift thereto.

12. The transfer system of claim 11, wherein said first conjugate mirror comprises a polarizer for circularly polarizing the linearly polarized energy entering the first phase conjugate mirror, and a focusing lens for directing the circularly polarized energy into a Brillouin medium.

13. The transfer system of claim 12, wherein said first conjugate mirror utilizes stimulated Brillouin scattering to create a phase conjugated beam of energy.

14. The transfer system of claim 10, wherein said phase conjugate mirror means includes a second phase conjugate mirror which receives a phase conjugated beam of energy from the first phase conjugate mirror and utilizes Brillouin enhanced four wave mixing to achieve phase conjugate mirror gains.

15. The transfer system of claim 1, wherein the phase conjugate mirror means includes a phase conjugate mirror and a variable frequency source.

16. The transfer system of claim 15, wherein the variable frequency source receives the second pulse of a doublet signal generated by the oscillator/amplifier means and reflected by the remote target, and applies a predetermined frequency shift thereto.

17. A method of transferring optical energy over an atmospheric path from a transmission source to a remote target, comprising the steps of:
generating a doublet pulse optical energy signal having a predetermined wavelength;
transmitting said generated optical energy toward the target;
receiving optical energy reflected from the target; and
amplifying the reflected optical energy signal using a phase conjugate mirror technique.

18. The energy transferring method of claim 17, wherein the phase conjugate mirror technique utilizes at least two separate phase conjugate mirrors.

19. The energy transferring method of claim 18, wherein one of said phase conjugate mirrors include a first phase conjugate mirror which receives the second pulse of a doublet signal reflected by the remote target and applies a predetermined frequency shift thereto.

20. The energy transferring method of claim 19, wherein said first conjugate mirror comprises a polarizer for circularly polarizing the linearly polarized energy entering the first phase conjugate mirror, and a focusing lens for directing the circularly polarized energy into a Brillouin medium.

21. The energy transferring method of claim 20, wherein said first conjugate mirror utilizes stimulated Brillouin scattering to create a phase conjugated beam of energy.

22. The energy transferring method of claim 18, wherein said phase conjugate mirrors include a second phase conjugate mirror which receives a phase conjugated beam of energy from the first phase conjugate mirror and utilizes Brillouin enhanced four wave mixing to achieve phase conjugate mirror gains.

23. The energy transferring method of claim 17, wherein the phase conjugate mirror technique utilizes a phase conjugate mirror and a variable frequency source.

24. The energy transferring method of claim 23, wherein the variable frequency source receives the second pulse of a doublet signal reflected by the remote target, and applies a predetermined frequency shift thereto.

* * * * *